(12) United States Patent
Lu

(10) Patent No.: US 8,607,586 B2
(45) Date of Patent: Dec. 17, 2013

(54) AIRCRAFT GALLEY REFRIGERATION SYSTEM WITH MULTI-CIRCUIT HEAT EXCHANGER

(75) Inventor: Qiao Lu, Brea, CA (US)

(73) Assignee: B/E Aerospace, Inc., Wellington, FL (US)

( * ) Notice: Subject to any disclaimer, the term of this patent is extended or adjusted under 35 U.S.C. 154(b) by 1088 days.

(21) Appl. No.: 12/033,996

(22) Filed: Feb. 20, 2008

(65) Prior Publication Data

US 2008/0196442 A1    Aug. 21, 2008

Related U.S. Application Data

(60) Provisional application No. 60/902,421, filed on Feb. 20, 2007.

(51) Int. Cl.
*F25D 11/00*    (2006.01)
*F25D 17/02*    (2006.01)
*F28F 3/08*    (2006.01)

(52) U.S. Cl.
USPC ................. 62/430; 62/185; 165/167

(58) Field of Classification Search
USPC ............. 62/423, 434, 407, 506, 507; 165/239
See application file for complete search history.

(56) References Cited

U.S. PATENT DOCUMENTS

| | | | |
|---|---|---|---|
| 1,969,187 A * | 8/1934 | Schutt ........................... | 165/236 |
| 2,779,171 A * | 1/1957 | Lindenblad ..................... | 62/435 |
| 3,210,820 A * | 10/1965 | Humiston .................... | 24/704.1 |
| 4,000,626 A * | 1/1977 | Webber .......................... | 62/175 |
| 4,104,890 A * | 8/1978 | Iwasaki ........................ | 62/324.1 |
| 4,217,765 A | 8/1980 | Ecker | |
| 4,420,035 A * | 12/1983 | Hewitt .......................... | 165/273 |
| 4,594,233 A | 6/1986 | Parrish | |
| 4,660,787 A | 4/1987 | Sprenger et al. | |
| 4,827,735 A * | 5/1989 | Foley .............................. | 62/430 |
| 4,865,123 A * | 9/1989 | Kawashima et al. .... | 165/104.33 |
| 5,044,172 A * | 9/1991 | Inoue et al. ..................... | 62/335 |
| 5,099,657 A * | 3/1992 | Huang ............................ | 62/431 |
| 5,245,833 A * | 9/1993 | Mei et al. ........................ | 62/113 |
| 5,318,109 A | 6/1994 | Yamada et al. | |
| 5,335,508 A * | 8/1994 | Tippmann ...................... | 62/129 |
| 5,369,960 A | 12/1994 | Mueller et al. | |
| 5,461,877 A * | 10/1995 | Shaw et al. ..................... | 62/185 |
| 5,462,113 A | 10/1995 | Wand | |
| 5,491,979 A * | 2/1996 | Kull et al. ....................... | 62/185 |
| 5,513,500 A * | 5/1996 | Fischer et al. .................. | 62/239 |
| 5,524,442 A * | 6/1996 | Bergman et al. ................. | 62/86 |
| 5,620,646 A * | 4/1997 | Sparer et al. ............. | 264/328.14 |
| 5,622,055 A * | 4/1997 | Mei et al. ........................ | 62/113 |

(Continued)

*Primary Examiner* — Khoa Huynh
*Assistant Examiner* — Timothy K Trieu
(74) *Attorney, Agent, or Firm* — Drinker Biddle & Reath LLP

(57) ABSTRACT

An aircraft galley refrigeration system is provided which, in one embodiment, includes: first and second galleys; a first chiller for providing a first heat transfer fluid to the first galley; a second chiller for providing a second heat transfer fluid to the second galley; and a heat exchanger including a first circuit and a second circuit, the first circuit connecting the first galley with the first chiller, and the second circuit connecting the second galley with the second chiller. In another embodiment, the system includes a first cooling subsystem with a first heat transfer fluid, a second cooling subsystem with a second heat transfer fluid, and a heat exchanger that thermally couples the first and second cooling subsystems for distributing heat between the first and second heat transfer fluids.

10 Claims, 5 Drawing Sheets

(56) References Cited

U.S. PATENT DOCUMENTS

| | | | |
|---|---|---|---|
| 5,743,102 A * | 4/1998 | Thomas et al. | 62/185 |
| 5,899,265 A * | 5/1999 | Schneider et al. | 165/104.33 |
| 5,921,092 A * | 7/1999 | Behr et al. | 62/81 |
| 6,131,401 A * | 10/2000 | Ueno et al. | 62/175 |
| 6,167,621 B1 * | 1/2001 | Goth et al. | 29/890.054 |
| 6,832,504 B1 * | 12/2004 | Birkmann | 73/40 |
| 6,836,977 B2 * | 1/2005 | Larson et al. | 36/59 R |
| 6,845,627 B1 * | 1/2005 | Buck | 62/185 |
| 6,880,351 B2 * | 4/2005 | Simadiris et al. | 62/185 |
| 6,935,417 B1 * | 8/2005 | Inoue et al. | 165/167 |
| 7,007,501 B2 | 3/2006 | Hu | |
| 7,024,874 B2 * | 4/2006 | Zywiak et al. | 62/199 |
| 7,089,756 B2 * | 8/2006 | Hu | 62/435 |
| 7,093,458 B2 | 8/2006 | Hu | |
| 7,096,932 B2 | 8/2006 | Scoville et al. | |
| 7,137,264 B2 * | 11/2006 | Simadiris et al. | 62/185 |
| 7,137,273 B2 * | 11/2006 | Ozaki et al. | 62/470 |
| 7,178,364 B2 * | 2/2007 | Shapiro et al. | 63/3 |
| 7,231,778 B2 * | 6/2007 | Rigney et al. | 62/407 |
| 7,409,782 B2 * | 8/2008 | Larson et al. | 36/59 R |
| 7,421,849 B2 * | 9/2008 | Simadiris et al. | 62/185 |
| 7,523,622 B2 * | 4/2009 | Zywiak et al. | 62/244 |
| 7,685,839 B2 * | 3/2010 | Gu | 62/503 |
| 7,765,831 B2 * | 8/2010 | Rodriguez et al. | 62/510 |
| 7,784,289 B2 * | 8/2010 | Scherer et al. | 62/99 |
| 8,018,718 B2 * | 9/2011 | Goth et al. | 361/699 |
| 2003/0042361 A1 * | 3/2003 | Simadiris et al. | 244/118.5 |
| 2005/0076661 A1 | 4/2005 | Zywiak et al. | |
| 2005/0178908 A1 * | 8/2005 | Simadiris et al. | 244/118.5 |
| 2005/0210910 A1 * | 9/2005 | Rigney et al. | 62/407 |
| 2007/0084226 A1 * | 4/2007 | Simadiris et al. | 62/184 |
| 2008/0087039 A1 * | 4/2008 | Reed et al. | 62/498 |

\* cited by examiner

AIRCRAFT GALLEY REFRIGERATION SYSTEM WITH MULTI-CIRCUIT HEAT EXCHANGER

CROSS-REFERENCE TO RELATED PATENT APPLICATIONS

This patent application claims the benefit of U.S. Provisional Patent Application No. 60/902,421, filed Feb. 20, 2007.

FIELD OF THE INVENTION

This invention pertains generally to aircraft galley refrigeration systems. More particularly, this invention pertains to an aircraft galley refrigeration system with a multi-circuit liquid heat exchanger.

BACKGROUND OF THE INVENTION

Aircraft galley refrigeration systems are used to refrigerate food carts, which are stored in at least one galley of the aircraft, to prevent spoilage of foodstuffs prior to providing the foodstuffs to onboard passengers. One conventional aircraft galley refrigeration system includes air chillers and cold air supply (or air ducting) systems in the galley that interface with the food carts to cool the interiors of the food carts. Another conventional aircraft galley refrigeration system includes at least one liquid chiller, a central or separate liquid recirculation unit, at least one galley air cooling unit, and a liquid plumbing system. Liquid chillers are remotely located from the galleys for chilling a heat transfer liquid that enters galley air cooling system devices. In such devices, heat is transferred from the interiors of the food carts to the liquid to keep the foodstuffs at proper storage temperature or temperatures (i.e., different galleys may store different foodstuffs, for example one galley may store a first type of foodstuff which requires one storage temperature and another galley may store another type of foodstuff or beverages which require another, different storage temperature) to prevent food spoilage.

One conventional aircraft galley refrigeration system that includes liquid chillers is illustrated in FIG. 1. As shown in FIG. 1, the aircraft galley refrigeration system 10 includes at least one galley 20, at least one remote chiller (RC) 30, and a central liquid recirculation unit (RU) 40. Although the at least one galley 20 includes three galley locations, namely Galley1 22, Galley2 24, and Galley3 26 as shown, the at least one galley 20 may include fewer or additional galley locations. Similarly, although the at least one RC 30 includes three RC locations, namely RC1 32, RC2 34, and RC3 36 as shown, the at least one RC 30 may include fewer or additional RC locations. However, the number of RCs generally corresponds with the number of galley locations in a one-to-one relationship. Each remote chiller, RC1 32, RC2 34, and RC3 36 as shown, is a self-contained refrigeration unit with a refrigerant vapor cycle system that removes heat from a heat transfer fluid. As shown, the at least one galley 20 receives low temperature heat transfer fluid from the at least one RC 30 via line 32. Also, the RU 40 receives high temperature heat transfer fluid from the at least one galley 20 via line 42. Furthermore, the at least one RC 30 receives from RU 40 the high temperature heat transfer fluid output from the at least one galley 20.

More particularly, Galley1 22, Galley2 24, and Galley3 26, which comprise the at least one galley 20, include respective heat transfer fluid inlets and outlets 22a, 22b; 24a, 24b; 26a, 26b. Similarly, RC1 32, RC2 34, and RC3 36, which comprise the at least one RC 30, include respective heat transfer fluid inlets and outlets 32a, 32b; 34a, 34b; 36a, 36b. Each heat transfer fluid inlet 22a, 24a, 26a of the galley locations 22, 24, 26 is fed low temperature heat transfer fluid by line 32. Each heat transfer fluid outlet 22b, 24b, 26b of the galley locations 22, 24, 26 exhausts high temperature heat transfer fluid to line 42 after the heat transfer fluid has absorbed the heat from cooling foodstuffs stored in the galley locations 22, 24, 26. RU 40 receives the high temperature heat transfer fluid exhausted to line 42 by the galley locations 22, 24, 26 (particularly the outlets 22b, 24b, 26b thereof) and pressurizes the heat transfer fluid. Additionally, each of the RC locations 32, 34, 36 (particularly the heat transfer fluid inlets 32a, 34a, 36a thereof) is fed high temperature, high pressure heat transfer fluid by RU 40. Each heat transfer fluid outlet 32b, 34b, 36b of the RC locations 32, 34, 36 outputs low temperature, high pressure heat transfer fluid to line 32 to work on cooling foodstuffs stored in the galley locations 22, 24, 26.

According to the foregoing, it can be appreciated that RU 40 defines a single point of failure of the system 10. That is, heat transfer fluid of the system 10 could not be sufficiently circulated between the at least one galley 20 and at least one remote chiller RC 30 if the RU 40 were to malfunction or fail. Furthermore, it can be appreciated that if heat transfer fluid were to leak from any one component of the system 10, the entire system 10 would need to be turned off so that repairs could be made. In view of the foregoing, a new aircraft galley refrigeration system would be an important improvement in the art.

BRIEF SUMMARY OF THE INVENTION

In an embodiment, an aircraft galley refrigeration system is provided that includes: a first galley; a first chiller for providing a first heat transfer fluid to the first galley; a second galley; a second chiller for providing a second heat transfer fluid to the second galley; and a heat exchanger including a first circuit and a second circuit, the first circuit connecting the first galley with the first chiller, and the second circuit connecting the second galley with the second chiller. The heat exchanger may be configured between inlets of the galleys and outlets of the chillers or, alternatively the heat exchanger may be configured between outlets of the galleys and inlets of the chillers.

In another embodiment, the system includes a first liquid cooling subsystem with a first heat transfer fluid, a second liquid cooling subsystem with a second heat transfer fluid, and a heat exchanger that thermally couples the first and second liquid cooling subsystems for distributing heat between the first and second heat transfer fluids. Each liquid cooling subsystem may include a galley, a chiller, and a fluid path for fluidly communicating a heat transfer fluid between the galley and the chiller.

DETAILED DESCRIPTION OF THE INVENTION

Figure 1:
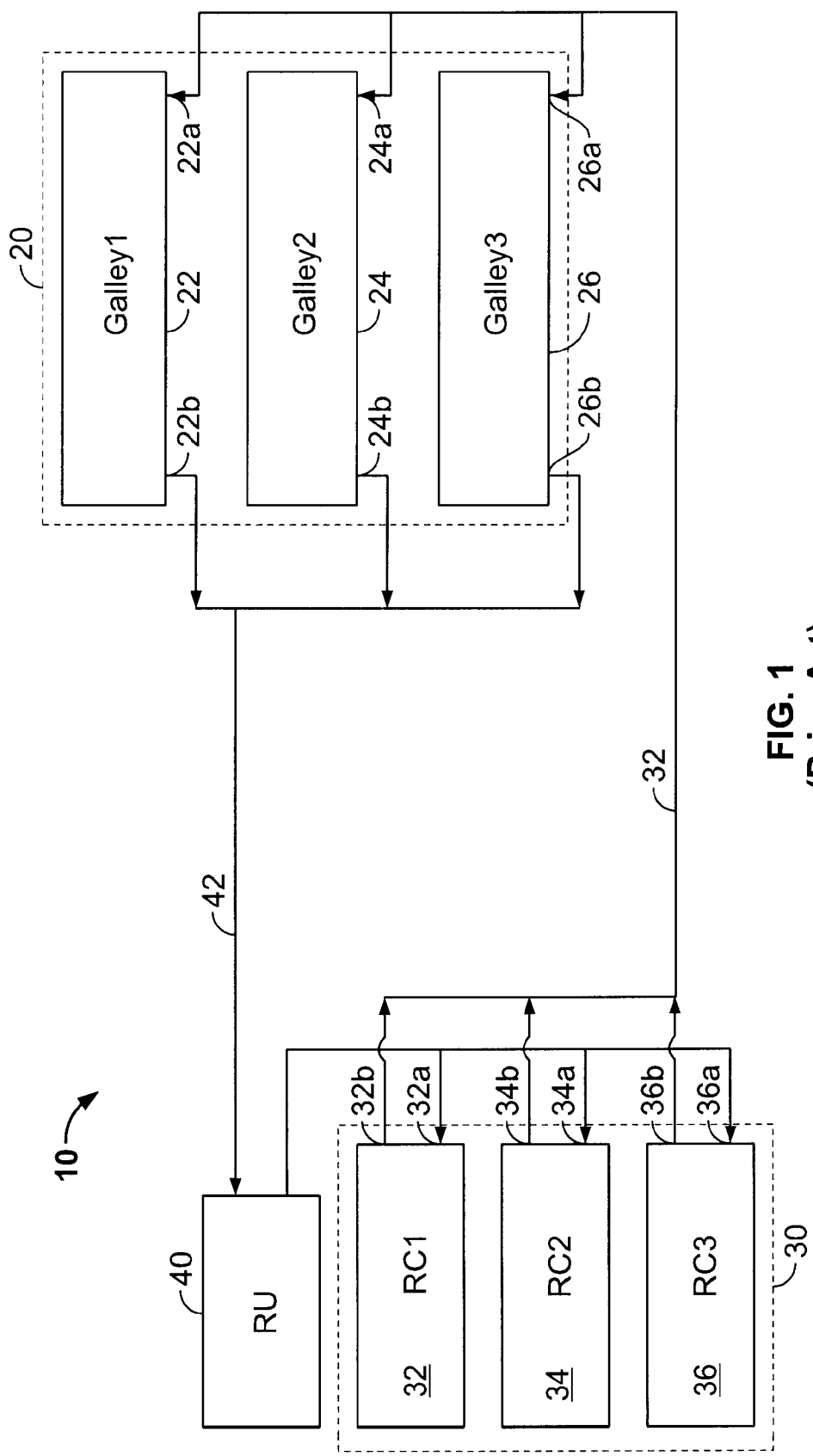
FIG. 1 illustrates a block diagram of a conventional aircraft galley refrigeration system.
Figure 2:
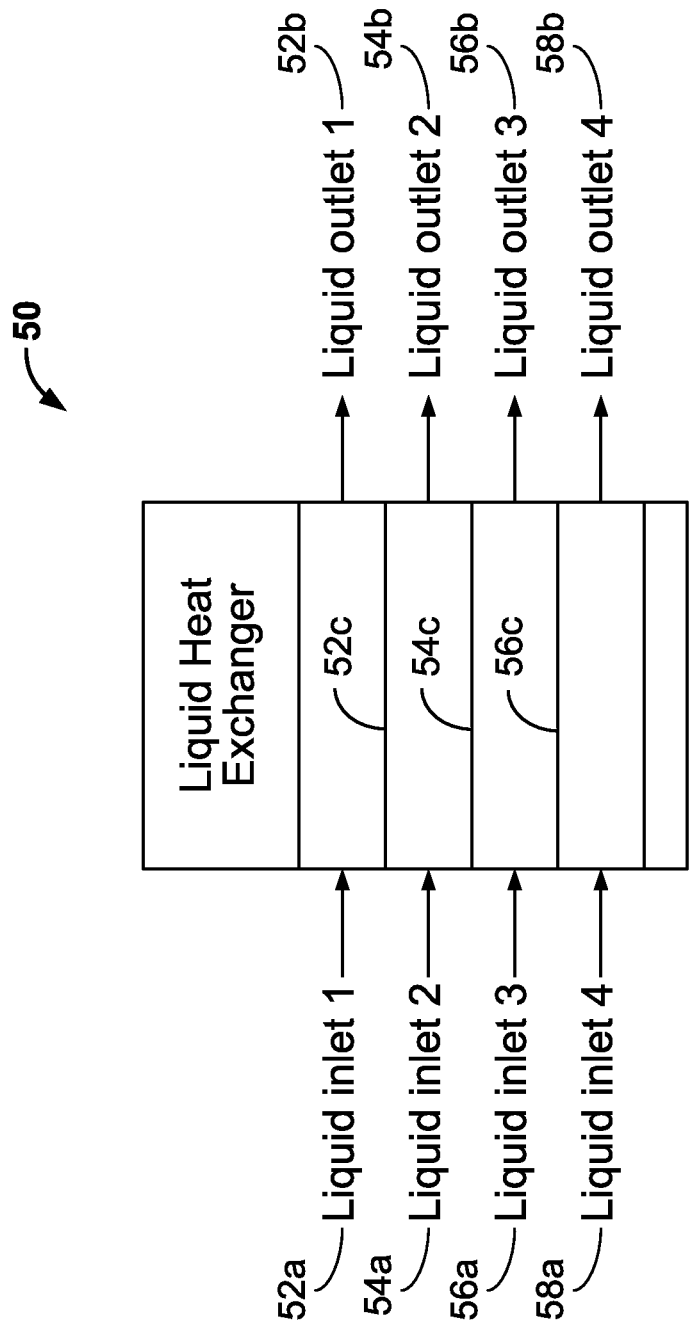
FIG. 2 illustrates a diagrammatic view of an example multi-circuit heat exchanger for an aircraft galley refrigeration system according to an embodiment of the present invention.

Turning now to the Figures, an aircraft galley refrigeration system is described. Various embodiments of the aircraft galley refrigeration system are provided which include a multi-circuit heat exchanger and chillers that are refrigeration generation and recirculation units. That is, the chillers described hereinafter incorporate recirculation functionality of the RU 40 and refrigeration functionality of the RCs 32, 34, 36 which were described previously with respect to FIG. 1. One example multi-circuit heat exchanger is diagrammatically shown in FIG. 2. As shown in FIG. 2, the example multi-circuit heat exchanger is a liquid heat exchanger 50. That is, the heat exchange fluid that is intended to be used with the heat exchanger 50 is a liquid. However, in some instances the heat exchange fluid used with the heat exchanger 50 may be a gas, a combination of a liquid and a gas, or a fluid that changes between liquid and gas phases.

As shown, the liquid heat exchanger 50 includes a first liquid inlet 52a ("Liquid inlet 1"), a second liquid inlet 54a ("Liquid inlet 2"), a third liquid inlet 56a ("Liquid inlet 3"), and a fourth liquid inlet 58a ("Liquid inlet 4"). Although the heat exchanger 50 is shown to include four liquid inlets 52a, 54a, 56a, 58a, the heat exchanger 50 may be configured to include fewer or additional inlets. The liquid heat exchanger 50 also includes a first liquid outlet 52b ("Liquid outlet 1"), a second liquid outlet 54b ("Liquid outlet 2"), a third liquid outlet 56b ("Liquid outlet 3"), and a fourth liquid outlet 58b ("Liquid outlet 4"). Although the heat exchanger 50 is shown to include four liquid outlets 52b, 54b, 56b, 58b, the heat exchanger 50 may be configured to include fewer or additional outlets. As shown, the number of outlets 52b, 54b, 56b, 58b generally corresponds with the number of inlets 52a, 54a, 56a, 58a in a one-to-one relationship so that distinct and separated channels, paths, conduits or circuits are defined through the heat exchanger 50. That is, inlet 52a and outlet 52b are in fluid communication with each other to define a first circuit therebetween. Similarly, second, third and fourth circuits are defined between respective inlet/outlet pairs 54a, 54b; 56a, 56b; and 58a, 58b. Adjacent circuits may include channels having a common wall 52c, 54c, or 56c separating the fluids of the adjacent channels. In this configuration each circuit is in thermal communication with an adjacent circuit or circuits. For example, a first heat transfer fluid flowing in the first circuit (i.e., between inlet 52a and outlet 52b) may exchange (i.e., accept or reject) heat with a second heat transfer fluid flowing the second circuit (i.e., between inlet 54a and outlet 54b) that is adjacent to the first circuit. Similarly, a second heat transfer fluid flowing in the second circuit (i.e., between inlet 54a and outlet 54b) may exchange (i.e., accept or reject) heat with a first heat transfer fluid flowing the first circuit and/or a third heat transfer fluid flowing in the third circuit (i.e., between inlet 56a and outlet 56b) since the second circuit is interposed between the first and third circuits. Accordingly, it can be appreciated that temperatures of the various heat transfer fluids flowing through the various circuits of the heat exchanger 50 may be substantially equalized in a passive manner. Although the heat exchanger 50 is illustrated as including distinct fluid circuits, channels, paths, conduits that are in at least partial physical contact with each other, alternatively the heat exchanger 50 may be configured as a manifold including a central chamber or reservoir in fluid communication with the inlets and outlets for mixing heat transfer fluid together and outputting various substantially equalized heat transfer fluid flows. Additionally, some embodiments of the heat exchanger 50 may include a fluid accumulator that is integral or unitary with the heat exchanger 50.

Figure 3:
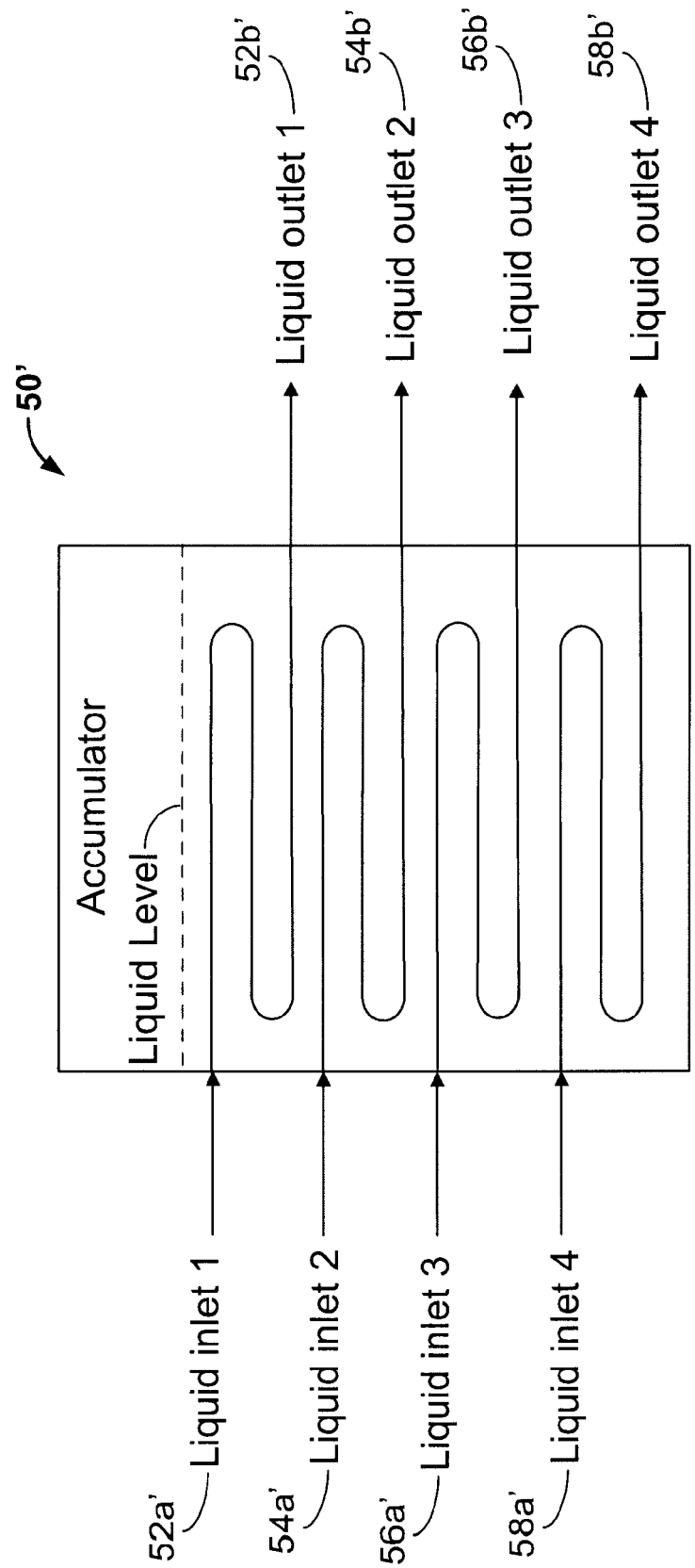
FIG. 3 illustrates a diagrammatic view of another example multi-circuit heat exchanger for an aircraft galley refrigeration system according to an embodiment of the present invention.

An example liquid heat exchanger including a fluid accumulator is illustrated in FIG. 3. As shown, liquid heat exchanger 50' includes a first liquid inlet 52a' ("Liquid inlet 1"), a second liquid inlet 54a' ("Liquid inlet 2"), a third liquid inlet 56a' ("Liquid inlet 3"), and a fourth liquid inlet 58a' ("Liquid inlet 4"). Although the heat exchanger 50' is shown to include four liquid inlets 52a', 54a', 56a', 58a', the heat exchanger 50' may be configured to include fewer or additional inlets. The liquid heat exchanger 50' also includes a first liquid outlet 52b' ("Liquid outlet 1"), a second liquid outlet 54b' ("Liquid outlet 2"), a third liquid outlet 56b' ("Liquid outlet 3"), and a fourth liquid outlet 58b' ("Liquid outlet 4"). Although the heat exchanger 50' is shown to include four liquid outlets 52b', 54b', 56b', 58b', the heat exchanger 50' may be configured to include fewer or additional outlets. As shown, the number of outlets 52b', 54b', 56b', 58b' generally corresponds with the number of inlets 52a', 54a', 56a', 58a' in a one-to-one relationship so that distinct and separated channels, paths, conduits or circuits are defined through the heat exchanger 50'. That is, inlet 52a' and outlet 52b' are in fluid communication with each other to define a first circuit therebetween. Similarly, second, third and fourth circuits are defined between respective inlet/outlet pairs 54a', 54b'; 56a', 56b'; and 58a', 58b'. As was explained previously with respect to example heat exchanger 50 (FIG. 2), each circuit of the heat exchanger 50' is in thermal communication with an adjacent circuit or circuits (e.g., by being in physical contact with a one or more circuit or circuits). Furthermore, since heat exchanger 50' includes a liquid accumulator, the four circuits are immersed in the heat transfer fluid as shown. By immersing the circuits in the heat transfer fluid, the transfer of heat may be facilitated or enhanced from each circuit as well as between circuits. Accordingly, it can be appreciated that temperatures of the various heat transfer fluids flowing through the various circuits of the heat exchanger 50' may be substantially equalized by the heat exchanger 50' in a passive manner. Although the heat exchanger 50' is illustrated as including distinct fluid circuits that pass through the accumulated heat transfer fluid, alternatively the heat exchanger 50' may be configured as a manifold including a central chamber or reservoir in fluid communication with the inlets and outlets for mixing heat transfer fluid together (e.g., accumulating heat transfer fluid from all or some of the circuits) and outputting various substantially equalized heat transfer fluid flows.

Figure 4:
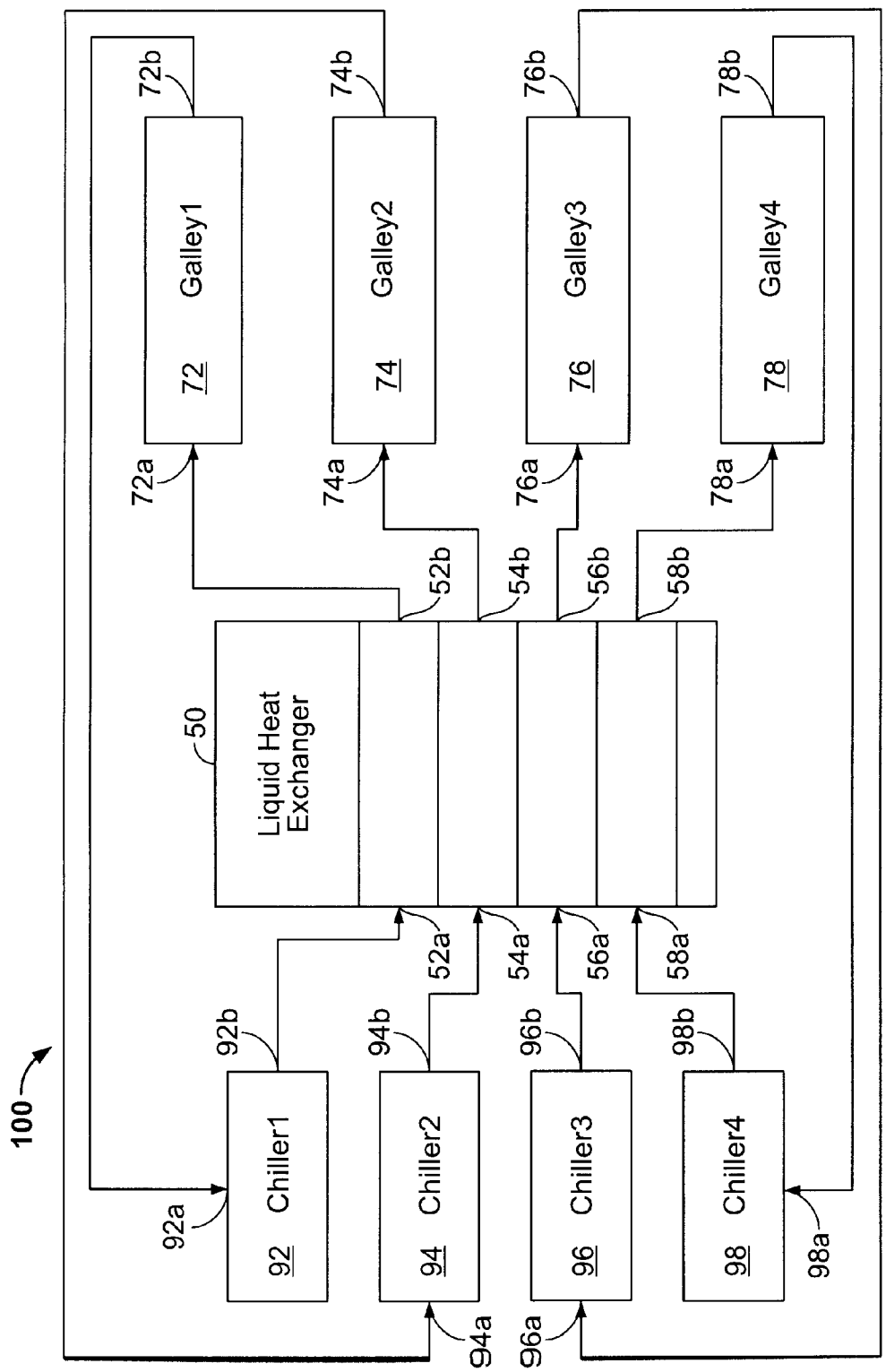
FIG. 4 illustrates a block diagram of one embodiment of an aircraft galley refrigeration system including the multi-circuit heat exchanger of FIG. 2.
Figure 5:
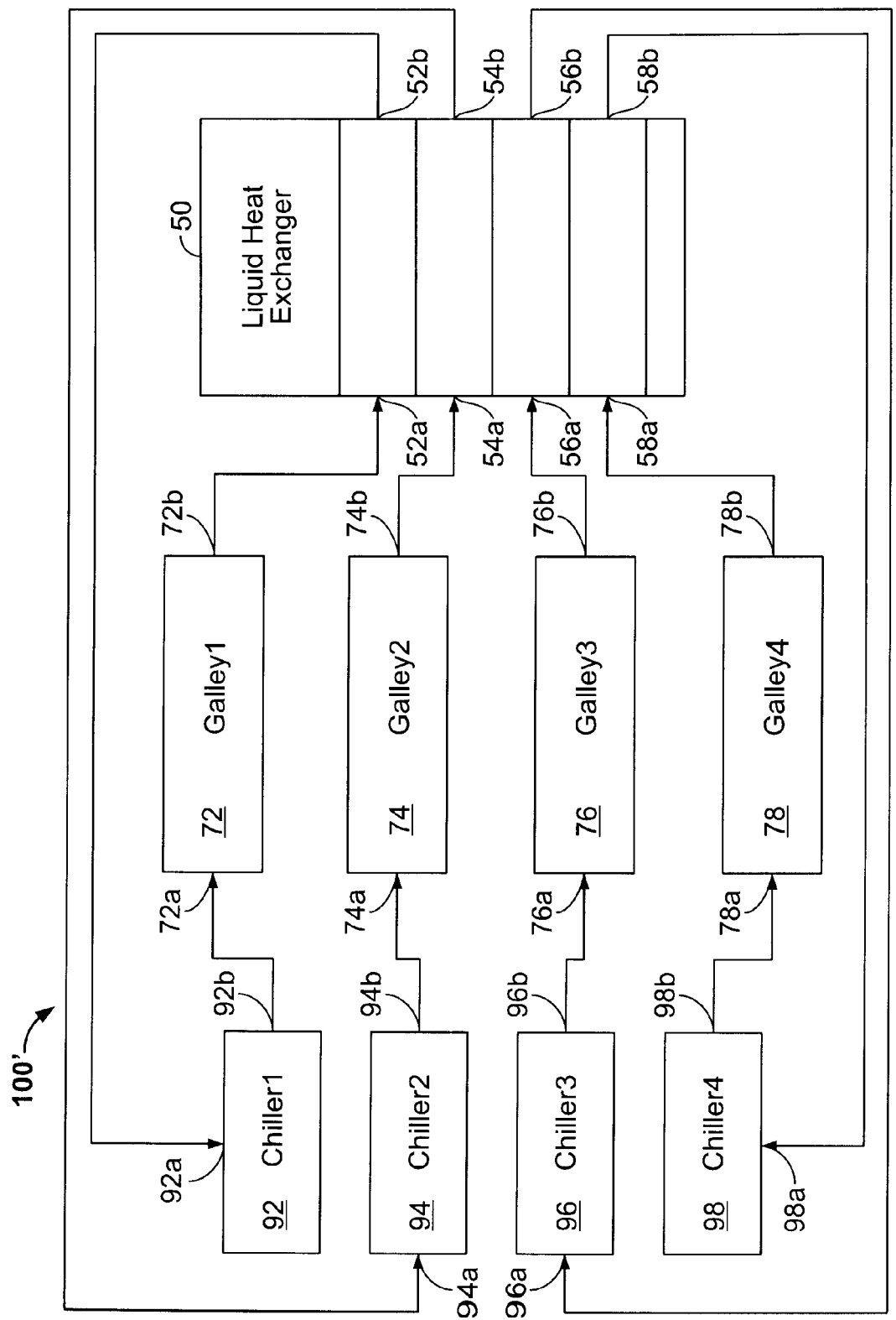
FIG. 5 illustrates a block diagram of another embodiment of an aircraft galley refrigeration system including the multi-circuit heat exchanger of FIG. 2.

Turning now to FIGS. 4 and 5, first and second embodiments are diagrammatically illustrated of an aircraft galley refrigeration system that includes a multi-circuit heat exchanger. Although the embodiments of the system 100, 100' are illustrated as including the example heat exchanger 50 (FIG. 2) interposed between a number of galleys and a number of chillers, it should be appreciated that the illustrated embodiments of the system 100, 100' may alternatively include the other example heat exchanger 50' (FIG. 3). The heat exchanger 50 is configured to interconnect galley/chiller pairs to define galley cooling subsystems. As shown in FIG. 4, the heat exchanger 50 of system 100 is configured in between the outlets of chillers and the inlets of galleys. However, as will be described hereafter with reference to FIG. 5, the heat exchanger 50 may be configured otherwise in relation to the inlets and outlets of the chillers and galleys.

As shown in FIG. 4, the first embodiment of the system 100 includes galleys (namely Galley1 72, Galley2 74, Galley3 76 and Galley4 78), chillers (namely Chiller1 92, Chiller2 94, Chiller3 96 and Chiller4 98), and heat exchanger 50. Although four galleys and four chillers are shown as being interconnected by heat exchanger 50 in the first embodiment of system 100, the system 100 may include fewer or additional galleys and heat exchangers (e.g., in a one-to-one relationship). As shown, each galley includes a heat transfer fluid inlet and outlet. That is, Galley1 72 includes inlet 72a and outlet 72b; Galley2 74 includes inlet 74a and outlet 74b; Galley3 76 includes inlet 76a and outlet 76b; and Galley 4 78 includes inlet 78a and outlet 78b. Heat transfer fluid flows in each galley from the galley's inlet to its outlet. As further shown, each chiller includes a heat transfer fluid inlet and outlet. That is, Chiller 1 92 includes inlet 92a and outlet 92b; Chiller2 94 includes inlet 94a and outlet 94b; Chiller3 96 includes inlet 96a and outlet 96b; and Chiller4 98 includes inlet 98a and outlet 98b. Heat transfer fluid flows in each chiller from the chiller's inlet to its outlet through an internal recirculation device.

As described previously, the heat exchanger 50 includes first, second, third and fourth circuits defined between respective inlet/outlet pairs 52a, 52b; 54a, 54b; 56a, 56b; and 58a, 58b. As shown, inlet 52a of heat exchanger 50 is in fluid communication with outlet 92b of chiller 92 while outlet 52b of heat exchanger 50 is in fluid communication with inlet 72a of galley 72. Furthermore, outlet 72b of galley 72 is in fluid communication with inlet 92a of chiller 92. As such, a first galley cooling subsystem is defined by galley 72, chiller 92 and the first circuit (i.e., the channel, path, conduit, etc. between inlet 52a and outlet 52b) of heat exchanger 50. Similarly, inlet 54a of heat exchanger 50 is in fluid communication with outlet 94b of chiller 94 while outlet 54b of heat exchanger 50 is in fluid communication with inlet 74a of galley 74. Furthermore, outlet 74b of galley 74 is in fluid communication with inlet 94a of chiller 94. As such, a second galley cooling subsystem is defined by galley 74, chiller 94 and the second circuit (i.e., the channel, path, conduit, etc. between inlet 54a and outlet 54b) of heat exchanger 50. Additionally, inlet 56a of heat exchanger 50 is in fluid communication with outlet 96b of chiller 96 while outlet 56b of heat exchanger 50 is in fluid communication with inlet 76a of galley 76. Furthermore, outlet 76b of galley 76 is in fluid communication with inlet 96a of chiller 96. As such, a third galley cooling subsystem is defined by galley 76, chiller 96 and the third circuit (i.e., the channel, path, conduit, etc. between inlet 56a and outlet 56b) of heat exchanger 50. Finally, inlet 58a of heat exchanger 50 is in fluid communication with outlet 98b of chiller 98 while outlet 58b of heat exchanger 50 is in fluid communication with inlet 78a of galley 78. Furthermore, outlet 78b of galley 78 is in fluid communication with inlet 98a of chiller 98. As such, a fourth galley cooling subsystem is defined by galley 78, chiller 98 and the fourth circuit (i.e., the channel, path, conduit, etc. between inlet 58a and outlet 58b) of heat exchanger 50. Since all of the galley cooling subsystems circulate their respective heat transfer fluid though loops which pass through the adjacent circuits of heat exchanger 50, if one or more of the chillers were to malfunction or fail, the system 100 can continue to provide sufficiently cooled fluid to each galley.

As shown in FIG. 5, the heat exchanger 50 of a second embodiment of system 100' is configured in between the outlets of galleys and the inlets of chillers. The second embodiment of system 100' includes galleys (namely Galley1 72, Galley2 74, Galley3 76 and Galley 4 78), chillers (namely Chiller1 92, Chiller2 94, Chiller3 96 and Chiller4 98), and heat exchanger 50. Although four galleys and four chillers are shown as being interconnected by heat exchanger 50 in the second embodiment of system 100 shown in FIG. 5, the system 100' may include fewer or additional galleys and heat exchangers (e.g., in a one-to-one relationship). As shown, each galley includes a heat transfer fluid inlet and outlet. That is, Galley1 72 includes inlet 72a and outlet 72b; Galley2 74 includes inlet 74a and outlet 74b; Galley3 76 includes inlet 76a and outlet 76b; and Galley4 78 includes inlet 78a and outlet 78b. Heat transfer fluid flows in each galley from the galley's inlet to its outlet. As further shown, each chiller includes a heat transfer fluid inlet and outlet. That is, Chiller1 92 includes inlet 92a and outlet 92b; Chiller2 94 includes inlet 94a and outlet 94b; Chiller3 96 includes inlet 96a and outlet 96b; and Chiller4 98 includes inlet 98a and outlet 98b. Heat transfer fluid flows in each chiller from the chiller's inlet to its outlet through an internal recirculation device.

As described previously, the heat exchanger 50 includes first, second, third and fourth circuits defined between respective inlet/outlet pairs 52a, 52b; 54a, 54b; 56a, 56b; and 58a, 58b. As shown, inlet 52a of heat exchanger 50 is in fluid communication with outlet 72b of galley 72 while outlet 52b of heat exchanger 50 is in fluid communication with inlet 92a of chiller 92. Furthermore, outlet 92b of chiller 92 is in fluid communication with inlet 72a of galley 72. As such, a first galley cooling subsystem is defined by galley 72, chiller 92 and the first circuit (i.e., the channel, path, conduit, etc. between inlet 52a and outlet 52b) of heat exchanger 50. Similarly, inlet 54a of heat exchanger 50 is in fluid communication with outlet 74b of galley 74 while outlet 54b of heat exchanger 50 is in fluid communication with inlet 94a of chiller 94. Furthermore, outlet 94b of chiller 94 is in fluid communication with inlet 74a of galley 74. As such, a second galley cooling subsystem is defined by galley 74, chiller 94 and the second circuit (i.e., the channel, path, conduit, etc. between inlet 54a and outlet 54b) of heat exchanger 50. Additionally, inlet 56a of heat exchanger 50 is in fluid communication with outlet 76b of galley 76 while outlet 56b of heat exchanger 50 is in fluid communication with inlet 96a of chiller 96. Furthermore, outlet 96b of chiller 96 is in fluid communication with inlet 76a of galley 76. As such, a third galley cooling subsystem is defined by galley 76, chiller 96 and the third circuit (i.e., the channel, path, conduit, etc. between inlet 56a and outlet 56b) of heat exchanger 50. Finally, inlet 58a of heat exchanger 50 is in fluid communication with outlet 78b of galley 78 while outlet 58b of heat exchanger 50 is in fluid communication with inlet 98a of chiller 98. Furthermore, outlet 98b of chiller 98 is in fluid communication with inlet 78a of galley 78. As such, a fourth galley cooling subsystem is defined by galley 78, chiller 98 and the fourth circuit (i.e., the channel, path, conduit, etc. between inlet 58a and outlet 58b) of heat exchanger 50. Since all of the galley cooling subsystems circulate their respective heat transfer fluids though loops which pass through the adjacent circuits of heat exchanger 50, if one or more of the chillers were to malfunction or fail, the system 100' can continue to provide sufficiently cooled fluid to each galley.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Various embodiments of this invention are described herein. However, it should be understood that the illustrated and described embodiments are exemplary only, and should not be taken as limiting the scope of the invention.

What is claimed is:

1. An aircraft galley refrigeration system comprising:
a first galley including a first galley inlet and a first galley outlet;
a first chiller including a first chiller inlet and a first chiller outlet, the first chiller inlet being in fluid communication with the first galley outlet;
a second galley including a second galley inlet and a second galley outlet;
a second chiller including a second chiller inlet and a second chiller outlet, the second chiller inlet being in fluid communication with the second galley outlet; and
a multi-circuit fluid heat exchanger including a first exchanger inlet, a first exchanger outlet, a second exchanger inlet, a second exchanger outlet, a first circuit defined between the first exchanger inlet and the first exchanger outlet, a second circuit defined between the second exchanger inlet and the second exchanger outlet, a first fluid circulating through the first circuit, and a second fluid circulating through the second circuit, the first and second circuits being distinct and separated such that the first and second circuits are not in fluid communication with each other and such that the first and second fluids do not mix with each other, the first exchanger inlet being in fluid communication with the first chiller outlet, the second exchanger inlet being in fluid communication with the second chiller outlet, the first exchanger outlet being in fluid communication with the first galley inlet, and the second exchanger outlet being in fluid communication with the second galley inlet, such that the first fluid circulates through the first circuit, the first galley and the first chiller to form a first closed loop, and the second fluid circulates through the second circuit, the second galley and the second chiller to form a second closed loop,
wherein the first and second circuits are first and second channels having a common wall separating the first and second fluids, the first and second circuits being in thermal communication with each other for distributing heat between the first and second fluids.

2. The system of claim 1 wherein the first and second circuits are interconnected parallel first and second channels.

3. The system of claim 1 wherein the heat exchanger further comprises a fluid accumulator that is integral with the heat exchanger.

4. The system of claim 1 wherein the first chiller and the second chiller each include a chiller inlet, a chiller outlet, and a recirculation device that circulates heat transfer fluid between the chiller inlet and the chiller outlet.

5. The system of claim 3 wherein the first and second circuits are immersed in heat transfer fluid within the fluid accumulator to facilitate transfer of heat among the first and second circuits.

6. An aircraft galley refrigeration system comprising:
a first galley including a first galley inlet and a first galley outlet;
a first chiller including a first chiller inlet and a first chiller outlet, the first chiller outlet being in fluid communication with the first galley inlet;
a second galley including a second galley inlet and a second galley outlet;
a second chiller including a second chiller inlet and a second chiller outlet, the second chiller outlet being in fluid communication with the second galley inlet; and
a multi-circuit fluid heat exchanger including a first exchanger inlet, a first exchanger outlet, a second exchanger inlet, a second exchanger outlet, a first circuit defined between the first exchanger inlet and the first exchanger outlet, a second circuit defined between the second exchanger inlet and the second exchanger outlet, a first fluid circulating through the first circuit, and a second fluid circulating through the second circuit, the first and second circuits being distinct and separated such that the first and second circuits are not in fluid communication with each other and such that the first and second fluids do not mix with each other, the first exchanger outlet being in fluid communication with the first chiller inlet, the second exchanger outlet being in fluid communication with the second chiller inlet, the first exchanger inlet being in fluid communication with the first galley outlet, and the second exchanger inlet being in fluid communication with the second galley outlet, such that the first fluid circulates through the first circuit, the first galley and the first chiller to form a first closed loop, and the second fluid circulates through the second circuit, the second galley and the second chiller to form a second closed loop,
wherein the first and second circuits are first and second channels having a common wall separating the first and second fluids, the first and second circuits being in thermal communication with each other for distributing heat between the first and second fluids.

7. The system of claim 6 wherein the first and second circuits are interconnected parallel first and second channels.

8. The system of claim 6 wherein the first chiller and the second chiller each include a chiller inlet, a chiller outlet, and a recirculation device that circulates heat transfer fluid between the chiller inlet and the chiller outlet.

9. The system of claim 6 wherein the heat exchanger further comprises a fluid accumulator that is integral with the heat exchanger.

10. The system of claim 9 wherein the first and second circuits are immersed in heat transfer fluid within the fluid accumulator to facilitate transfer of heat among the first and second circuits.

* * * * *